US012801493B2

(12) United States Patent
Jung et al.

(10) Patent No.: US 12,801,493 B2
(45) Date of Patent: Nov. 17, 2026

(54) PROCESSOR AND MEMORY SYSTEM INCLUDING THE SAME

(71) Applicant: SAMSUNG ELECTRONICS CO., LTD., Suwon-si (KR)

(72) Inventors: Jaehwan Jung, Suwon-si (KR); Hee Hyun Nam, Suwon-si (KR); Jinwoo Song, Suwon-si (KR); Gyeonghwan Yu, Suwon-si (KR); Jinmyung Yoon, Suwon-si (KR); Youngseob Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 18/794,447

(22) Filed: Aug. 5, 2024

(65) Prior Publication Data

US 2025/0252015 A1 Aug. 7, 2025

(30) Foreign Application Priority Data

Feb. 1, 2024 (KR) ........................ 10-2024-0016205

(51) Int. Cl.
*G06F 11/10* (2006.01)
*G06F 9/30* (2018.01)
*G06F 9/38* (2018.01)

(52) U.S. Cl.
CPC ...... *G06F 11/1068* (2013.01); *G06F 9/30047* (2013.01); *G06F 9/3858* (2023.08); *G06F 11/1016* (2013.01)

(58) Field of Classification Search
CPC ............. G06F 11/1068; G06F 9/30047; G06F 9/3858; G06F 11/1016
See application file for complete search history.

(56) References Cited

U.S. PATENT DOCUMENTS

| | | | | |
|---|---|---|---|---|
| 4,995,041 | A | 2/1991 | Hetherington et al. | |
| 7,302,619 | B1 * | 11/2007 | Tompkins ........... | G06F 11/1064 712/231 |
| 7,437,597 | B1 | 10/2008 | Kruckemyer et al. | |
| 8,316,277 | B2 | 11/2012 | Flynn et al. | |
| 9,256,495 | B2 * | 2/2016 | Sano .................. | G06F 11/1048 |
| 9,917,601 | B2 | 3/2018 | DeBrosse et al. | |

(Continued)

FOREIGN PATENT DOCUMENTS

JP 6927610 9/2021

*Primary Examiner* — Albert Decady
*Assistant Examiner* — Kareem Fuad Alhwamdeh
(74) *Attorney, Agent, or Firm* — Fish & Richardson P.C.

(57) ABSTRACT

A processor comprising an instruction fetch unit configured to read a first instruction stored in an external memory through a first data bus, generate a first correction instruction in which an error is corrected based on an error checking and correcting (ECC) operation for the first instruction, store an information for the first correction instruction, read a second instruction stored in the external memory through the first data bus according to a second instruction fetch, and transmit the first correction instruction to the external memory through the first data bus based on a flush condition, a decode unit configured to receive and decode the first correction instruction, and an execution unit configured to receive the decoded first correction instruction and execute an operation according to the first correction instruction.

20 Claims, 13 Drawing Sheets

(56) References Cited

U.S. PATENT DOCUMENTS

| | | | | |
|---|---|---|---|---|
| 10,956,262 | B2 * | 3/2021 | Golov | G06F 12/0804 |
| 2004/0215896 | A1 * | 10/2004 | McCalpin | G06F 9/30047 712/E9.032 |
| 2005/0144379 | A1 | 6/2005 | Eschmann | |
| 2009/0248987 | A1 | 10/2009 | Jung et al. | |
| 2010/0115202 | A1 * | 5/2010 | Zimmer | G06F 12/126 711/E12.017 |
| 2011/0107143 | A1 | 5/2011 | Nakatsuka | |

* cited by examiner

400

700

800

PROCESSOR AND MEMORY SYSTEM INCLUDING THE SAME

This application claims priority to and the benefit of Korean Patent Application No. 10-2024-0016205 filed in the Korean Intellectual Property Office on Feb. 1, 2024, the entire contents of which are incorporated herein by reference.

BACKGROUND

A cache is a component that stores a data so that it may be used more quickly in response to data read or write requests. The cache may be implemented as a volatile memory device such as a static random access memory (SRAM).

Meanwhile, as a performance of an electron system improves and an integration and a speed thereof increase, a process technology is becoming more refined. As a process scale is reduced, a bit error ratio of the memory device may increase rapidly and the yield may decrease. Accordingly, the memory devices include error checking and correcting (ECC) circuits to improve the reliability of the stored data. The ECC circuit may check errors in the data stored in memory devices and correct errors.

SUMMARY

In general, in some aspects, the present disclosure is directed toward a processor with improved performance and a memory system including the same, and a processor that efficiently delivers corrected data and a memory system including the same.

According to some implementations, the present disclosure is directed to a processor comprising an instruction fetch unit configured to read a first instruction stored in an external memory through a first data bus according to a first instruction fetch in a first cycle, generate a first correction instruction in which an error is corrected based on an error checking and correcting (ECC) operation for the first instruction, store an information for the first correction instruction, read a second instruction stored in the external memory through the first data bus according to a second instruction fetch in a second cycle after the first cycle, and transmit the first correction instruction to the external memory through the first data bus based on a flush condition for transmitting the first correction instruction to the external memory is satisfied in a third cycle after the second cycle, a decode unit configured to receive the first correction instruction and decode the first correction instruction, and an execution unit configured to receive the decoded first correction instruction and execute an operation according to the first correction instruction.

According to some implementations, the present disclosure is directed to an operation method of a processor that includes reading a first instruction from an instruction cache through a first data bus, correcting an error of the first instruction and generating a first correction instruction, storing an information about the first correction instruction, reading a second instruction from the instruction cache through the first data bus, and writing back the first correction instruction to the instruction cache through the first data bus based on the flush condition.

According to some implementations, the present disclosure is directed to a memory system that includes a cache memory to store a plurality of data, and a processor that configured to read a first data and a second data among the plurality of data from the cache memory according to a host request, store a first error corrected data and a second error corrected data generated according to an ECC operation for the first data and the second data, and transmit the first error corrected data and the second error corrected data to the cache memory according to a cache flush instruction.

BRIEF DESCRIPTION OF THE DRAWINGS

Example implementations will be more clearly understood from the following detailed description, taken in conjunction with the accompanying drawings.

DETAILED DESCRIPTION

Figure 1:
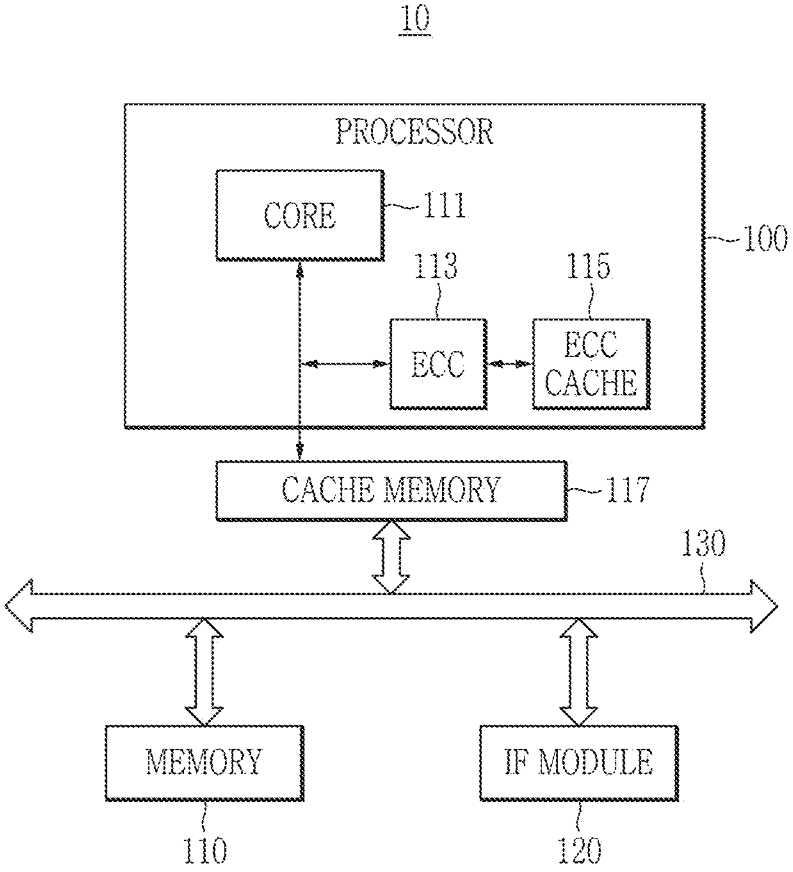
FIG. 1 is a view showing an example of a memory system according to some implementations.

Hereinafter, example implementations will be explained in detail with reference to the accompanying drawings. Like reference numerals designate like elements throughout the present disclosure. The sequence of operations or steps is not limited to the order described in the present disclosure, unless specifically indicated otherwise.

In the present disclosure, the singular forms “a”, “an” and “the” are intended to include the plural forms as well, unless the context clearly indicates otherwise. Terms including ordinal numbers, such as first, second, and the like, will be used only to describe various components, and are not to be interpreted as limiting these components. These terms may be used for the purpose of distinguishing one constituent element from other constituent elements.

FIG. 1 is a view showing an example of a memory system according to some implementations. In FIG. 1, a memory system 10 may include a processor 100, a memory 110, and an interface module 120.

In some implementations, the processor 100 may control overall operations of the memory system 10. Specifically, a core 111 may read and execute program instructions according to the request of the host. For example, the core 111 may read instructions stored in the cache memory 117 or the memory 110 according to the request of the host and perform operations according to the instructions. The core 111 may read a data stored in the cache memory 117 or the memory 110 or write a data to the cache memory 117 or the memory 110 to perform the operations according to the instructions. In some implementations, the processor 100 may include a plurality of cores.

In some implementations, when the processor 100 reads an instruction or reads a data according to an instruction, the processor 100 may first check whether the data to be read is stored in the cache memory 117. As the processor 100 reads the instructions or data stored in the cache memory 117, a waiting time for reading the instructions or data may be reduced compared to reading the instructions or data stored in the memory 110. If the processor 100 does not find the data in the cache memory 117 (i.e., if there is a cache miss), it may read the data stored in the memory 110 through the bus 130.

In some implementations, the memory system 10 may include multi-level caches. For example, the memory system 10 may include a level-1 cache and level-2 caches. In an embodiment, the cache memory 117 may be the level-1 cache or the level-2 cache. Additionally, the cache memory 117 may be positioned within the processor 100. In some implementations, the cache memory 117 may be an instruction cache in which the instructions are stored or a data cache in which the data is stored. In some implementations, the cache memory 117 may store the instructions and the data together. In some implementations, the processor 100 may access the cache memory 117 to read the instructions or the data. The processor 100 may read the commands or the data stored in the cache memory 117 according to the host's request and perform the operations or the calculation accordingly.

In some implementations, the processor 100 may include an ECC unit 113. The instructions or the data stored in the cache memory 117 may be damaged for various reasons. The ECC unit 113 may detect such data damage or error and, at least in some cases, correct it and restore the intended data before the damage. The ECC unit 113 may perform an ECC encoding and an ECC decoding by using a single error correction and double error detection (SECDED) code, a bose-chaudhuri-hocquenghem (BCH) code, a low density parity check (LDPC) code, a reed-solomon code, or other error correction code.

In some implementations, the ECC unit 113 may perform the ECC encoding on the data to be written to the cache memory 117. Specifically, the ECC unit 113 may generate parity bits for a write data to be written to the cache memory 117. The ECC unit 113 may write a code word CW including the data and the parity bits to the cache memory 117.

In some implementations, the ECC unit 113 may perform the decoding on the read data read from the cache memory 117 as the instructions or the data. Specifically, the ECC unit 113 may read the code word CW from the cache memory 117 as the read data and detect the errors in the code word CW. The ECC unit 113 may correct the errors in the code word CW by using an error correction code. The ECC unit 113 may transmit the corrected data to the core 111 as an instruction or a data.

In some implementations, the ECC unit 113 may include an ECC cache memory 115. The ECC cache memory 115 may be a volatile memory device. If an error exists in the read data read from the cache memory 117 as a command or a data, the ECC unit 113 may correct the error and transmit an information about the corrected data to the ECC cache memory 115. The information about the corrected data may include the corrected data or the information on the bits in which an error occurred in the read data, but it is not limited thereto. In an embodiment, the ECC cache memory 115 may receive the information about the corrected data from the ECC unit 113 and store it. The ECC cache memory 115 may receive the information about the corrected data along with the memory address of the cache memory 117 where the corresponding read data was stored, and store it.

In some implementations, the ECC unit 113 may generate the corrected data based on information about the corrected data stored in the ECC cache memory 115 and transmit the corrected data to the cache memory 117. Accordingly, the data in the cache memory 117 may be changed to the data in which the error is corrected. Meanwhile, the cache memory 117 and the processor 100 may transmit/receive the data through one path (or a channel). Accordingly, while the ECC unit 113 writes the corrected data to the cache memory 117, the processor 100 may not read the instructions or data stored in the cache memory 117. In other words, the write operation to the cache memory 117 of the processor 100 and the read operation from the cache memory 117 may not be performed simultaneously. Accordingly, the ECC unit 113 may transfer the corrected data stored in the ECC cache memory 115 to the cache memory 117 when a specific condition is satisfied. Hereinafter, the specific condition may be referred to as a flush condition. For example, the flush condition may include when the pipeline of the processor 100 is stalled or when the processor 100 performs a cache flush, but is not limited thereto.

In some implementations, the memory system 10 may include an interface module 120. The memory system 10 may communicate with the host through the interface module 120. The interface module 120 may be implemented in various interface methods such as a universal serial bus (USB), a multi-media card (MMC), a PCI express (PCI-E), an AT attachment (ATA), a serial AT attachment (SATA), a parallel AT attachment (PATA), a small computer system interface (SCSI), a serial attached SCSI (SAS ( ) an enhanced small disk interface (ESDI), an integrated drive electronics (IDE), a non-volatile memory express (NVMe), etc.

In some implementations, the memory system 10 may comprises memory 110. The memory 110 may be used as a main memory device of the memory system 10, and may include a volatile memory such as a SRAM and/or a DRAM, or a non-volatile memory such as a flash memory. The memory 110 may be connected to the processor 100 through a bus 130.

Figure 2:
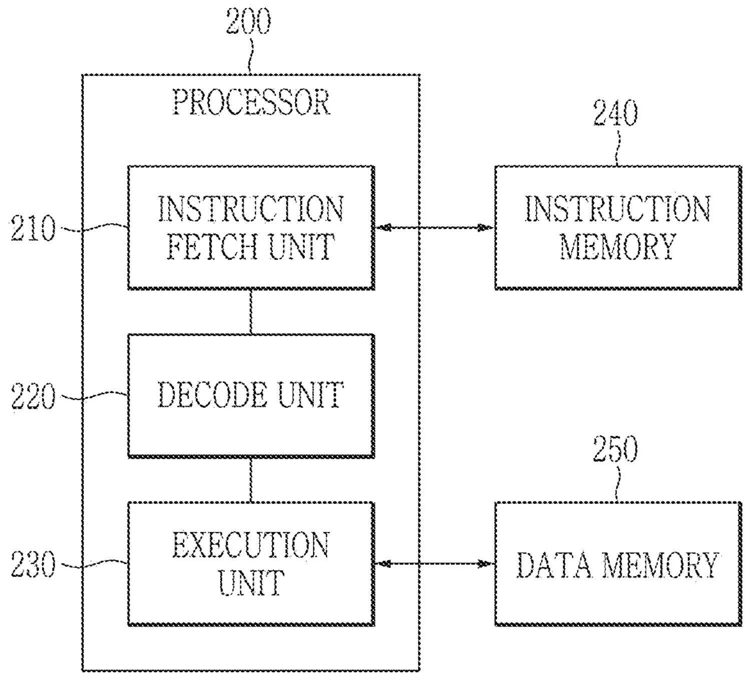
FIG. 2 is a view showing n examples of a configuration and an operation of a processor according to some implementations.

FIG. 2 is a view showing examples of a configuration and an operation of a processor according to some implementations. In FIG. 2, the processor 200 may include an instruction fetch unit 210, a decode unit 220, and an execution unit 230. However, it is not limited to this, and processor 200 may further include various other configurations.

Specifically, the instruction fetch unit 210 may fetch an instruction instructing to execute program instructions according to a program order from the instruction memory 240. Here, the instruction memory 250 may be the cache memory 117 according to FIG. 1. For example, the instruction fetch unit 210 may fetch the instruction word that instructs an arithmetic instruction such as an addition, a load instruction, a store instruction, etc. from the instruction memory 250.

The instruction word fetched by the instruction fetch unit 210 may be transmitted to the decode unit 220. The decode unit 220 may decode the instruction fetched by the instruction fetch unit 210 and provide the decoded instruction to the execution unit 230.

Based on the decoded instruction, the execution unit 230 may perform operations according to the instruction. For example, the instructions transmitted from the decode unit 220 may instruct a floating point computation, or instruct to read the data stored in the data memory 250 and to store the data in the data memory 250. Here, the data memory 250 may be the cache memory 117 according to FIG. 1. The execution unit 230 may access the data memory 250 to read the data stored in the data memory 250 or to store the data in the data memory 250 according to the instruction transmitted from the decode unit 220.

When reading the data stored in the instruction memory 240 or the data memory 250, the instruction fetch unit 210 or the execution unit 230 may perform an ECC operation to detect and correct errors in the read data.

Figure 3:
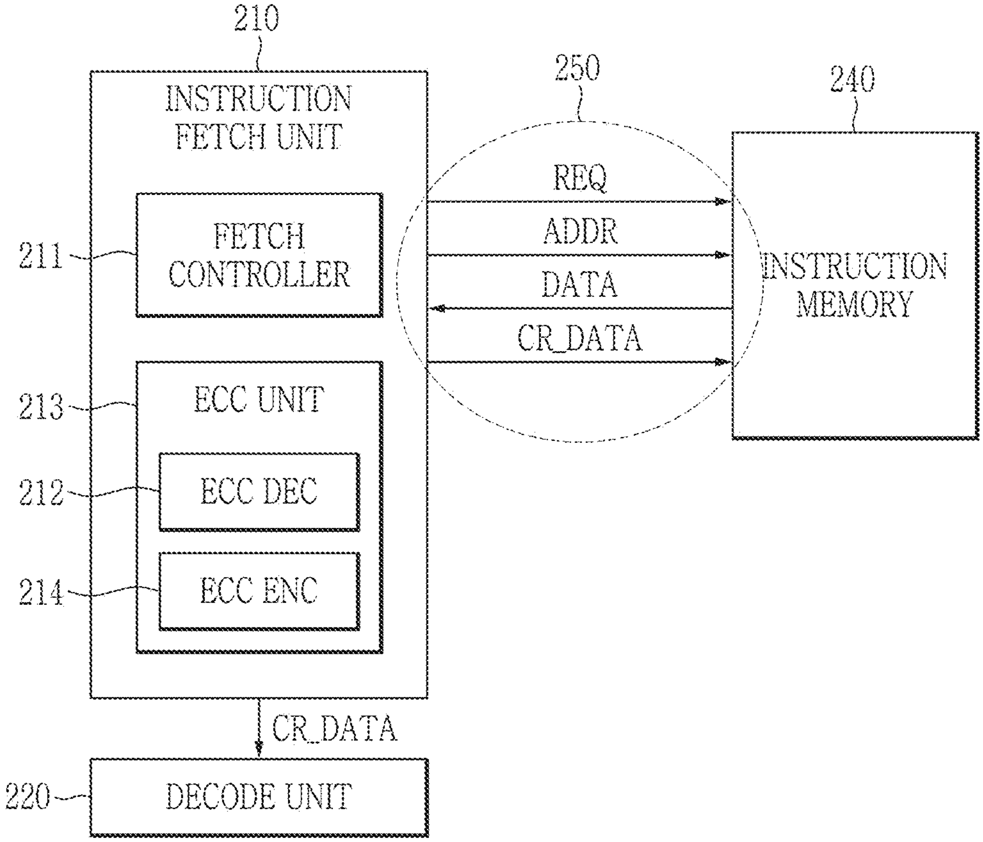
FIG. 3 is a view showing examples of a composition and an operation of an instruction fetch unit according to some implementations.

FIG. 3 is a view showing examples of a configuration and an operation of an instruction fetch unit according to some implementations. In FIG. 3, the instruction fetch unit 210 may include an ECC unit 213 that detects and corrects errors in the instruction word when fetching the instruction from the instruction memory 240. Below, for a more concise explanation, the ECC operation performed by the instruction fetch unit 210 will be representatively described. However, the range of the present disclosure is not limited thereto, and the execution unit 230 may also perform the same or similar operations on the data stored in the data memory 250.

In some implementations, the instruction fetch unit 210 may include a fetch controller 211 and an ECC unit 213. The fetch controller 211 may control the overall operation of the instruction fetch unit 210. Specifically, the instruction fetch unit 210 may transmit a request signal REQ and an address ADDR to the instruction memory 240 and receive a data DATA from the instruction memory 240 according to the control of the fetch controller 211. Here, the data DATA may refer to an instruction that instructs the arithmetic instructions such as the addition, the load instructions, the storage instructions, etc.

In some implementations, the ECC unit 213 may include an ECC decoder 212 that performs the decoding on the data DATA received from the instruction memory 240. Specifically, the ECC decoder 212 may detect the error in the instruction received as the data DATA from the instruction memory 240 and correct the error using an error correction code. The instruction fetch unit 210 may transmit the corrected data CR_DATA to the decode unit 220.

In an embodiment, the ECC unit 213 may transmit the corrected data CR_DATA to the instruction memory 240. Specifically, the ECC unit 213 may change the data stored in the instruction memory 240 to the corrected data CR_DATA by writing the corrected data CR_DATA to the instruction memory 240.

In some implementation, the request signal REQ, the address ADDR, the data DATA, and the corrected data CR_DATA may be transmitted/received through a channel between the instruction fetch unit 210 and the instruction memory 240. Here, the channel may refer to the path through which the request signal REQ, the address ADDR, the data DATA, and the corrected data CR_DATA are transmitted, and may be referred to as a data bus 250. Meanwhile, since only one data bus 250 is formed between the instruction fetch unit 210 and the instruction memory 240, when the instruction memory 240 transmits the data DATA to the instruction fetch unit 210, the instruction fetch unit 210 may be not transmit the corrected data CR_DATA to the instruction memory 240. This is described with reference to FIG. 4 and FIG. 5 in detail.

Figure 4:
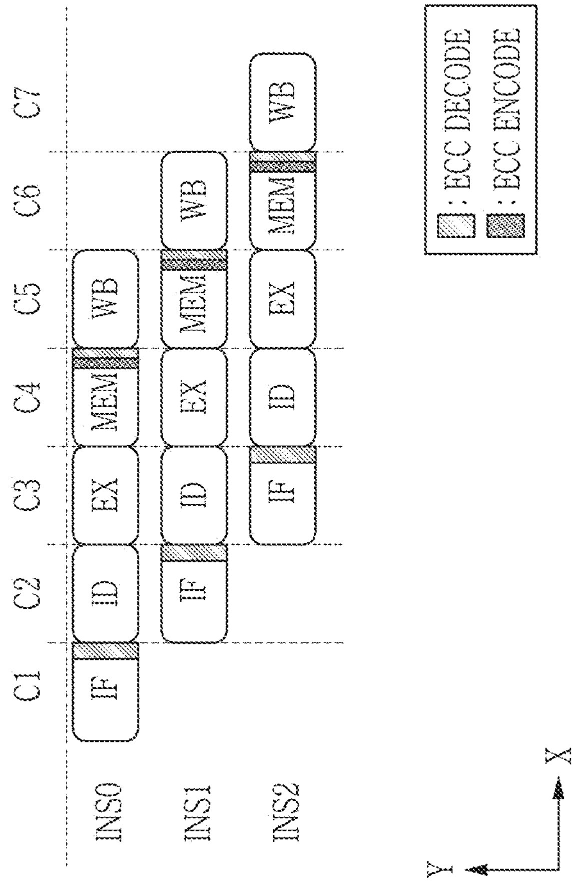
FIG. 4 is a view showing an example of a pipeline of a processor according to some implementations.

FIG. 4 is a view showing an example of a pipeline of a processor according to some implementations. Below, for a more concise explanation, a pipeline 400 of five-stages will be representatively described. However, the scope of the present disclosure is not limited to this.

In FIG. 4, a first direction (e.g., a X direction) may represent a cycle, and a second direction (e.g., a Y direction) may represent an instruction INS.

Each instruction INS0, INS1, and INS2 may perform five stages sequentially. Specifically, an instruction fetch (IF) in which the processor (200 in FIG. 2) completes the execution of the instruction and fetches the instruction to be executed next from the instruction memory (240 in FIG. 2), an instruction decode (ID) that performs a decoding of the instruction fetched from the instruction memory 240, an execution (EX) where instructions are executed according to the decoded instructions, a memory access (MEM) of accessing the data memory 250 to read the data stored in the data memory 250 or store the data in the data memory 250 according to the instructions, and a write back (WB) in which the data is stored in a register or the data memory 250 within the processor 200 according to the instruction may be performed. In FIG. 4, by executing each instruction INS0, INS1, and INS2 sequentially, the same operation may be performed in different cycles. Additionally, the performance of the processor and the memory system may be improved by making each instruction INS0, INS1, and INS2 in parallel.

Meanwhile, the ECC operation may be performed in the instruction fetch (IF) and the memory access (MEM). For example, when fetching the instruction from the instruction memory 240, the instruction fetch unit 210 may detect an error within the instruction word and perform the ECC decoding to correct the error. In addition, when storing the data in the data memory 250 or reading the data from the data memory 250 according to the instruction, the execution unit 230 may perform the ECC encoding on the write data to be stored in the data memory 250 or may perform the ECC decoding for the read data read from the data memory 250.

The instruction fetch unit 210 may generate the corrected data CR_DATA by performing the ECC decoding on the instruction fetched from the instruction memory 240 and transmit the corrected data CR_DATA back to the instruction memory 240. Likewise, the execution unit 230 may generate the data in which the error is corrected by performing the ECC decoding on the data read from the data memory 250, and transmit the data back to the data memory 250. However, the processor 200 and the instruction memory 240, and the processor 200 and the data memory 250 transmit/receive the data and signals through one data bus, so when the processor 200 simultaneously performs different operations, an Instruction conflict that the different operations simultaneously occupy the data bus may occur. This is described with reference to FIG. 5 later.

Figure 5:
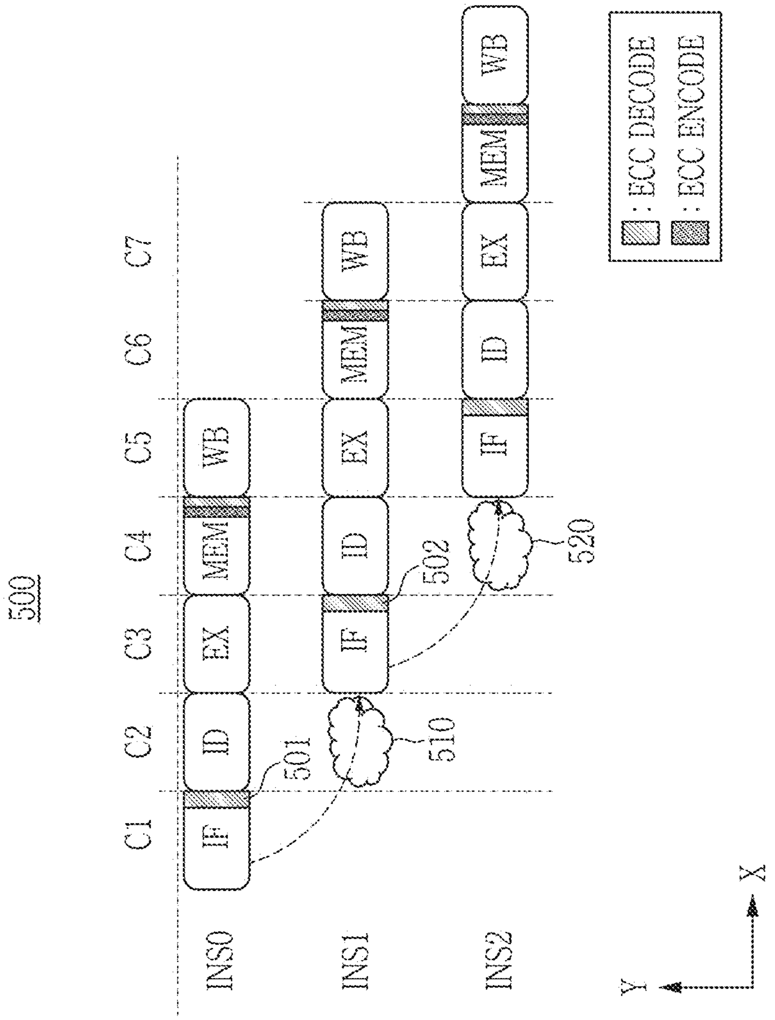
FIG. 5 is a view showing an example of an instruction conflict according to some implementations.

FIG. 5 is a view showing an example of an instruction conflict according to some implementations. Specifically, FIG. 5 is a view to explain the instruction conflict that occurs when the instruction fetch unit 210 reads the data from the instruction memory 240 and simultaneously transfers the corrected data CR_DATA to the instruction memory 240.

Hereinafter, for a more concise explanation, the operation of the instruction fetch unit 210 will be representatively described. However, the range of the present disclosure is not limited thereto, and the execution unit 230 may operate identically or similarly.

In FIG. 5, the instruction fetch unit 210 and the instruction memory 240 may exchange the data or signals through the data bus. However, since the instruction fetch unit 210 and the instruction memory 240 transmit/receive the data through one data bus, when the instruction memory 240 transmits the data to the instruction fetch unit 210, the instruction fetch unit 210 may not transmit the data to the instruction memory 240.

Referring to the pipeline 500 of FIG. 5, when the instruction fetch unit 210 performs the instruction fetch (IF) according to the first instruction INS0 in the first cycle C1, the instruction fetch unit 210 may receive the instruction from the instruction data 240 through the data bus. The instruction fetch unit 210 may perform the ECC decoding 501 to detect errors in the received instructions and to generate the corrected data. After this, in the second cycle C2, the instruction fetch unit 210 will attempt to transfer the corrected data to the instruction memory 240 through the data bus. Meanwhile, the instruction fetch unit 210 will also attempt to perform the instruction fetch (IF) to receive the instruction from the instruction data 240 through the data bus according to the second instruction INS1 in the second cycle C2. Accordingly, an instruction conflict in which different operations simultaneously occupy the data bus may occur. When such an instruction conflict occurs, the processor 200 may stall the pipeline and perform one of them first. For example, as shown in FIG. 5, in the second cycle C2, the processor 200 may stall (510) the pipeline 500, and the instruction fetch unit 210 may first transmit the corrected data of the instruction received according to the instruction fetch (IF) of the first instruction INS0 to the instruction memory 240. Next, the stall may be released and the remaining operations may be performed. For example, the instruction fetch unit 210 may perform the instruction fetch (IF) according to the second instruction INS1 in the third cycle C3.

Additionally, the same operation may be performed for the second instruction IN1. For example, when performing the instruction fetch (IF) according to the second instruction IN1 in the third cycle C3, the instruction fetch unit 210 may receive the instruction from the instruction data 240 through the data bus. The instruction fetch unit 210 may perform the ECC decoding 502 to detect errors in the received instructions and to generate the corrected data. Next, in the fourth cycle C4, the instruction fetch unit 210 will attempt to transfer the corrected data to the instruction memory 240 through the data bus. Meanwhile, the instruction fetch unit 210 will also attempt to perform the instruction fetch (IF) according to the third instruction INS2 in the fourth cycle C4. Accordingly, the instruction conflict may occur in which different operations simultaneously occupy the data bus. Accordingly, in the fourth cycle C4, the processor 200 may stall (520) the pipeline. This pipeline stall stops the pipeline according to the next instruction, so if the pipeline stalls occur frequently, the performance of the processor 200 and the memory system is deteriorated.

Figure 6:
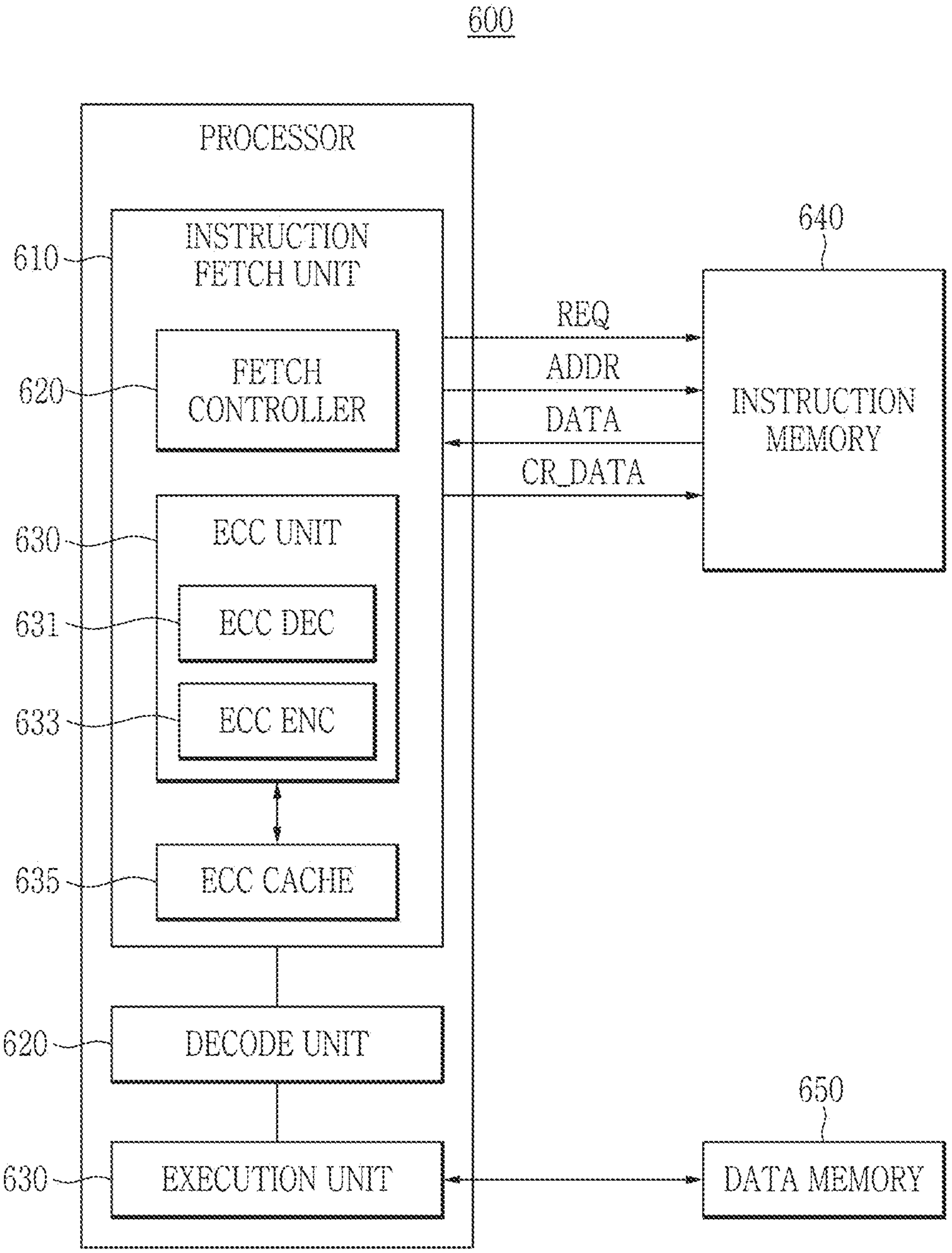
FIG. 6 is a view showing examples of a configuration and an operation of an instruction fetch unit according to some implementations.

FIG. 6 is a view showing examples of a configuration and an operation of an instruction fetch unit according to some implementations. In FIG. 6, an instruction fetch unit 610 in a processor 600 may include a fetch controller 620, an ECC unit 630, and an ECC cache memory 653. Hereinafter, for a more concise explanation, the operation of the instruction fetch unit 610 according to some implementations will be representatively described. However, the range of present disclosure is not limited thereto, and the execution unit 630 within the processor 600 may also perform the same or similar operations as the instruction fetch unit 610 for the data stored in the data memory 650.

In some implementations, the instruction fetch unit 610 may include a fetch controller 620 and an ECC unit 630. The fetch controller 620 may control the overall operation of the instruction fetch unit 610. Based on the control of the fetch controller 620, the ECC unit 630 may perform ECC decoding on the instruction word received as data DATA from the instruction memory 640 and generate the corrected data CR_DATA. The instruction fetch unit 610 may transmit the corrected data CR_DATA to the decode unit 620. The specific operation method of the fetch controller 620 and the ECC unit 630 according to an embodiment is the same or similar to the operation method of the fetch controller 211 and the ECC unit 213 described in FIG. 3 so that the descriptions that overlap with those in FIG. 3 are omitted here.

In some implementations, the instruction fetch unit 610 may further include an ECC cache memory 635. The ECC cache memory 635 may be a volatile memory device. The ECC unit 630 according to an embodiment may transmit an information about the corrected data CR_DATA to the ECC cache memory 635. The ECC cache memory 635 may receive the information about the corrected data CR_DATA from the ECC unit 630 and store it.

In some implementations, the ECC unit 630 may generate the corrected data CR_DATA based on information about the corrected data CR_DATA stored in the ECC cache memory 635 and transmit the corrected data CR_DATA to the instruction memory 640. The ECC unit 630 may change the data stored in the instruction memory 640 into the corrected data CR_DATA by transferring and writing the corrected data CR_DATA to the instruction memory 640.

The information about the corrected data CR_DATA transmitted by the ECC unit 630 to the cache memory 635 is described with reference to FIG. 7 later.

Figure 7:
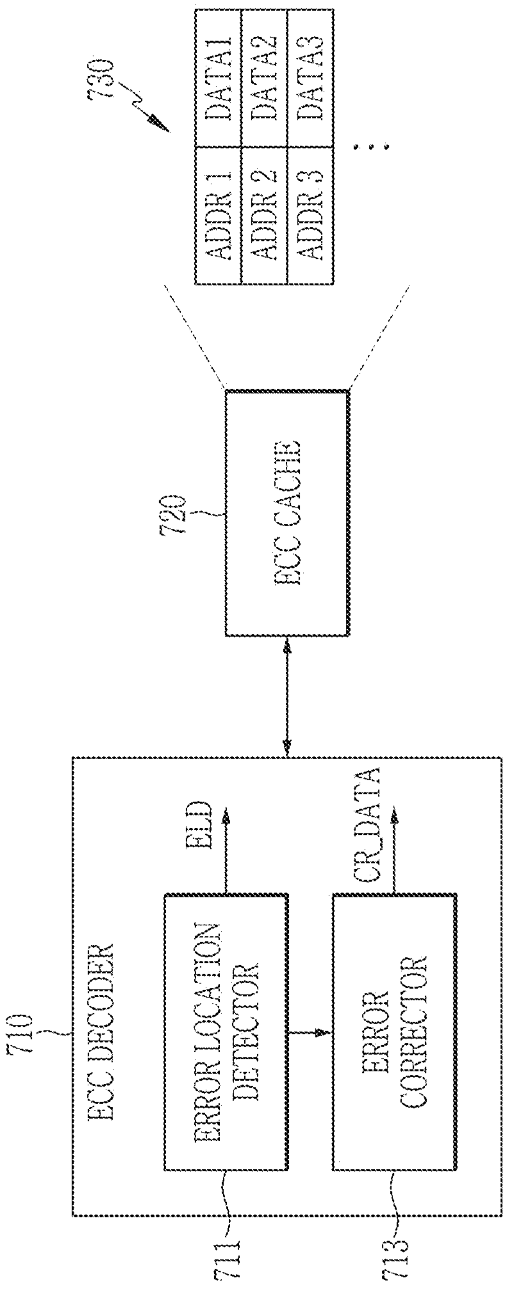
FIG. 7 is a view showing an example of an information stored in an ECC cache memory according to some implementations.

FIG. 7 is a view showing an example of information stored in an ECC cache memory according to some implementations. In FIG. 7, an ECC unit 700 may include an ECC decoder 710 and an ECC cache memory 720. The ECC cache memory 720 according to an embodiment may receive and store the information 730 about the corrected data from the ECC decoder 710.

In some implementations, the ECC decoder 710 may include an error location detector 711 and an error corrector 713. In some implementations, the instruction memory (640 in FIG. 6) may store, as an instruction, the code word CW including the parity bit generated by the ECC encoder. The ECC decoder 710 may receive the code word CW from the instruction memory 640 and generate the corrected data CR_DATA based on it.

In some implementations, the error location detector 711 may detect the position of the error bit included in the code word CW. Specifically, the error location detector 711 may generate a parity check bit based on the data and the parity bit included in the code word CW. The method by which the error location detector 711 generates the parity check bit may be similar to the method by which the ECC unit 700 generates the parity bit. For example, the error location detector 711 may generate the parity check bit so that the number of ‘1’s in the entire bit within the code word CW is even or odd. The error location detector 711 may detect the position of the error bit included in the code word CW based on the parity check bit and generate an error position information ELD.

In some implementations, the error corrector 713 in the ECC decoder 710 may generate the corrected data CR_DATA based on the error position information ELD generated by the error location detector 711. For example, the error corrector 713 can receive error position information ELD from error location detector 711 and generate the corrected data CR_DATA by inverting the bit value of the position.

In some implementations, the ECC decoder 710 may transmit an information 730 about the corrected data to the ECC cache memory 720. For example, the information 730 about the corrected data may be the error position information ELD or the corrected data CR_DATA. The ECC cache memory 720 may store the error position information ELD or the corrected data CR_DATA received from the ECC decoder 710 as an information DATA1, DATA2, DATA3, . . . about the corrected data. In some implementations, the ECC decoder 710 may transmit together the address of the instruction memory 640 where the corresponding code word was stored to the ECC cache memory 720 as the address of the instruction memory 640 where the corrected data will be stored. The ECC cache memory 720 may store the address of the instruction memory 640 received from the ECC decoder 710 as the address ADDR1, ADDR2, ADDR3, . . . of the instruction memory, where the corrected data will be stored.

In some implementations, the ECC unit 700 may transmit the corrected data CR_DATA to the instruction memory 640 based on the address ADDR1, ADDR2, ADDR3, . . . of the instruction memory stored in the ECC cache memory 720 and the information (DATA1, DATA2, DATA3, . . . of the corrected data. Specifically, the ECC decoder 710 may receive the address of the instruction memory and the error position information ELD from the ECC cache memory 720. The ECC decoder 710 may generate the corrected data CR_DATA based on the error position information ELD received from the ECC cache memory 720, and may write the corrected data CR_DATA to the corresponding address based on the address ADDR1, ADDR2, ADDR3, . . . of the instruction memory. In some implementations, the ECC decoder 710 may receive the address of the instruction memory and the corrected data CR_DATA from the ECC cache memory 720. The ECC decoder 710 may write the corrected data CR_DARA to the corresponding address based on the address ADDR1, ADDR2, ADDR3, . . . of the instruction memory received from the ECC cache memory 720.

In FIGS. 3 to 5, since the processor and the instruction memory including the ECC unit transmit/receive the data and signals through one data bus, the write operation to the instruction memory of the processor and the read operation from the instruction memory may not be performed simultaneously. Accordingly, the ECC unit 700 may transmit the corrected data stored in the ECC cache memory 720 to the instruction memory 640 when the flush condition is satisfied. Here, the flush condition may include when the pipeline of the processor 600 is stalled or when the processor 600 performs the cache flush. The flush condition in which the ECC unit 700 transmits the corrected data stored in the ECC cache memory 720 to the instruction memory 640 is described with reference to FIG. 8 later.

Figure 8:
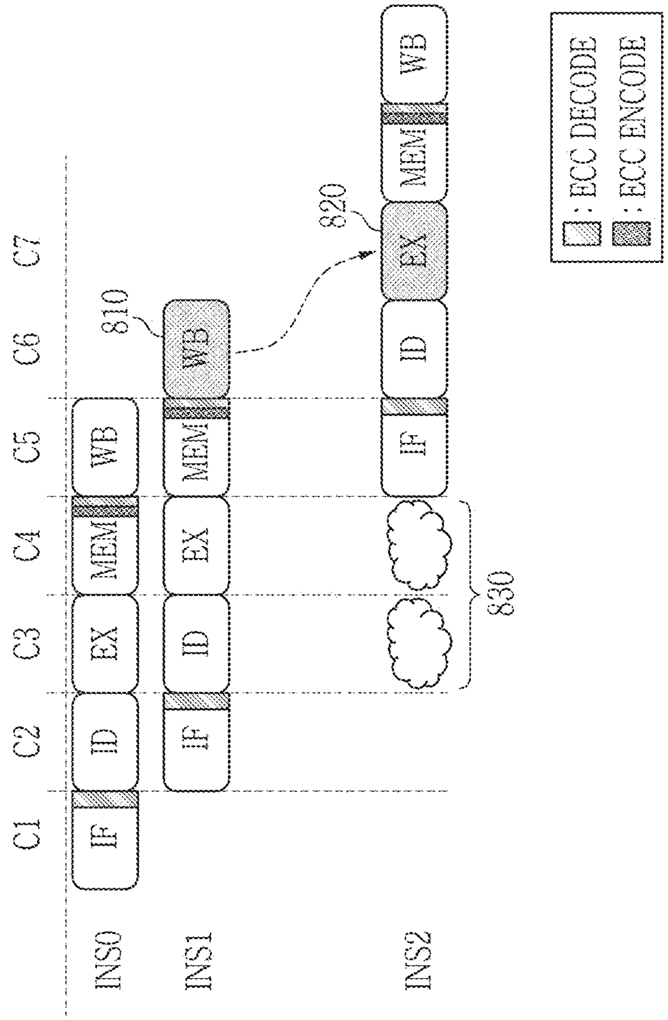
FIG. 8 is a view showing an example of a pipeline stall according to some implementations.

FIG. 8 is a view showing an example of a pipeline stall according to some implementation. Specifically, FIG. 8 is an example of the flush condition in which the ECC unit (630 in FIG. 6) transmits the corrected data CR_DATA stored in the ECC cache memory 635 to the instruction memory 640 and is the view to explain the pipeline stall.

In FIG. 6, the processor 600 may read the instructions stored in the instruction memory 640 and read the data stored in the data memory 650 according to the host's request. The instruction fetch unit 610 may access the instruction memory 640 to read the instruction, and the execution unit 630 may access the data memory 650 to read the data. The processor 600 may access the instruction memory 640 to perform the instruction fetch (IF) of the pipeline, and access the data memory 650 to perform the memory access (MEM) to load and store the data.

In FIG. 8, each step according to the first instruction INS0 to the third instruction INS2 may be performed sequentially and in parallel. In this process, the execution (EX) according to the third instruction INS2 may use the data according to the second instruction INS1. For example, the third instruction INS2 may instruct to perform the operation based on the data generated according to the second instruction INS1 in the execution (820). In this case, in order to obtain the data generated according to the second instruction INS1, the execution (820) according to the third instruction INS2 must be performed after the write back (810) according to the second instruction INS1.

In some implementations, the processor 600 may stall (830) the pipeline so that the execution (820) according to the third instruction INS2 is performed after the write back (810) according to the second instruction INS1. The processor 600 may stall the pipeline in a third cycle C3 and a fourth cycle C4 to perform the operations according to the third instruction INS2 after performing the write back (810) according to the second instruction INS1.

In some implementations, in the stall cycle in which the pipeline is stalled (830), that is, in the third cycle C3 and the fourth cycle C4, the data bus between the processor 600 and the instruction memory 640 is not occupied by any data. Accordingly, the ECC unit 630 of the processor 600 may transmit the corrected data stored in the ECC cache memory 635 to the instruction memory 640 in the third cycle C3 and the fourth cycle C4.

Here, the pipeline stall that occurs when the later instruction (e.g., the third instruction INS2) uses the result data of the previous instruction (e.g., the second instruction INS1) is explained as an example, but it is not limited thereto and the pipeline stall may be caused by various causes. Additionally, in the stall cycle section due to various causes, the data bus is not occupied by any data, so the processor 600 may transmit the data stored in the ECC cache memory 635 to the instruction memory 640.

As another example, the corrected data stored in the ECC cache memory 635 may be transmitted to the instruction memory 640 by a cache flush instruction. For example, when the data stored in the ECC cache memory 635 exceeds a certain ratio of the storage capacity of the ECC cache memory 635, the processor 600 may instruct the cache flush to instruct the data stored in the ECC cache memory 635 to be moved to the instruction memory 640. By the cache flush instruction, the data stored in the ECC cache memory 635 may be transmitted to and stored in the instruction memory 640. By the cache flush instruction, the data in the instruction memory 640 may be changed to the corrected data.

Figure 9:
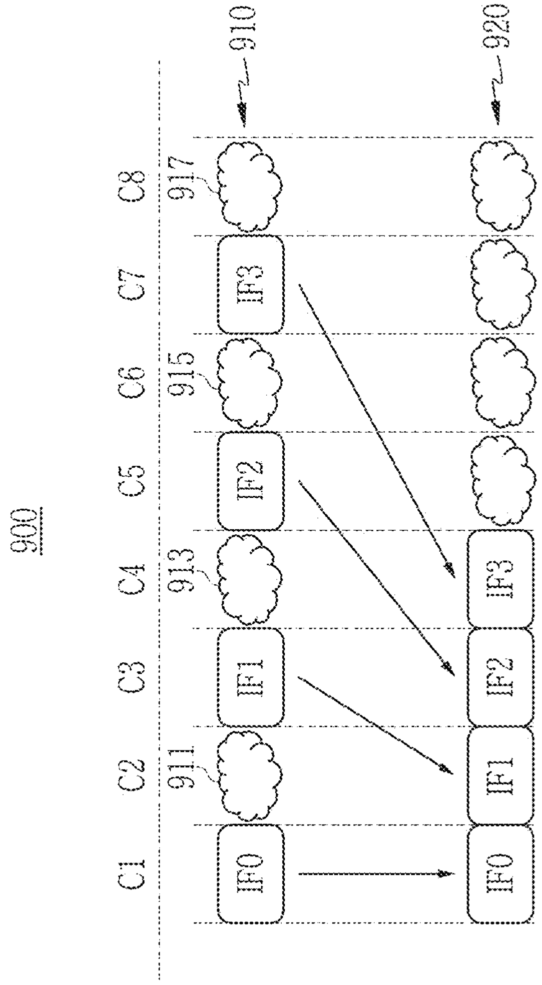
FIG. 9 is a view showing an example of an improved performance of a processor and a memory system according to some implementations.

FIG. 9 is a view showing examples of an improved performance of a processor and a memory system according to some implementations.

First, looking at an instruction fetch operation 910 according to a comparative example, the processor may perform the first instruction fetch IF0 according to the first instruction in the first cycle C1, and if there is an error in the instruction received in the first instruction fetch IF0, it may transmit the corrected data to the instruction memory in the second cycle C2. When the corrected data is transferred to the instruction data in the second cycle C2, the corrected data occupies the data bus between the processor and the instruction memory, so the processor may stall the pipeline so that the next instruction is not executed. When the corrected data is transmitted to the instruction memory in the second cycle C2, the processor may release the pipeline stall and perform the second instruction fetch IF1 according to the second instruction in the third cycle C3. In this way, the instruction fetch operation 910 according to the comparative example may alternately perform the instruction fetch (IF) and the pipeline stall 911, 913, and 915. Therefore, eight cycles (C1 to C8) may be consumed from the first instruction fetch IF0 till the performing of the fourth instruction fetch IF3.

On the other hand, referring to the instruction fetch operation 920 according to an embodiment, the processor may perform the first instruction fetch IF0 according to the first instruction in the first cycle C1, and after the first instruction fetch IF0 is performed, the processor may perform the second instruction fetch IF1 according to the second instruction in the second cycle C2. According to some implementations, if there is an error in the instruction received in the first instruction fetch IF0, the processor may store the corrected data in which the corresponding error is corrected in the ECC cache memory within the processor. Additionally, if there is an error in the instruction received in the second instruction fetch IF1, the processor may store the corrected data in which the corresponding error is corrected in the ECC cache memory within the processor. Afterwards, if the pipeline stall occurs for various reasons, the processor may transmit the corrected data stored in the ECC cache memory to the instruction memory in the stall cycle. As such, the instruction fetch operation 920 according to an embodiment continuously performs the plurality of instruction fetches (IF) according to the plurality of instructions, and transfers the corrected data stored in the ECC cache memory to the instruction memory when the flush condition is satisfied, four cycles C1 to C4 may be consumed from the first instruction fetch IF0 to the performing of the fourth instruction fetch IF3. In other words, there is an advantage in improving the performance of the processor and the memory system by reducing unnecessary pipeline stalls.

Figure 10:
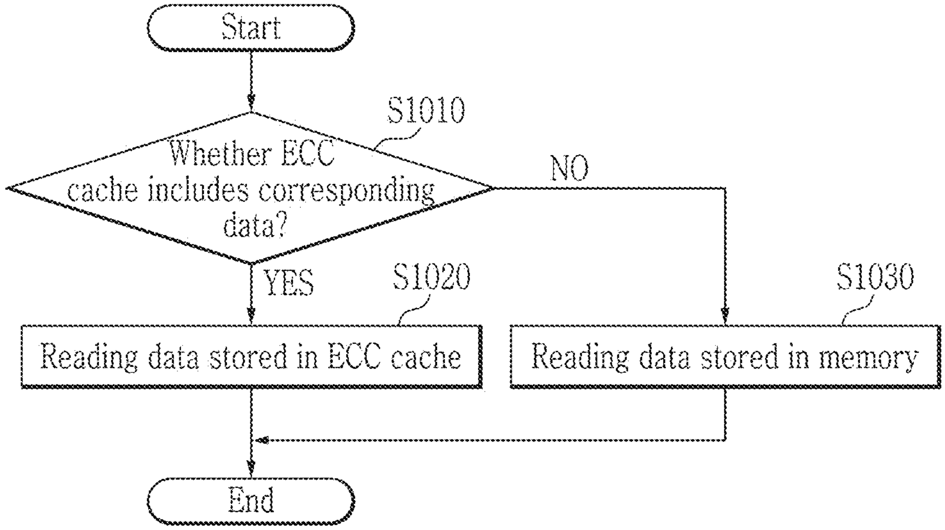
FIG. 10 is a flowchart showing an example of a processor operation method according to some implementations.

FIG. 10 is a flowchart showing an example of an operation method of a processor according to some implementations.

An instruction fetch unit of the processor may read instructions from an instruction memory according to a request of a host, and an execution unit may read a data from a data memory. If the instruction word read from the instruction memory includes an error, the instruction fetch unit of the processor may correct the corresponding error and store the information about the corrected data in the ECC cache memory within the instruction fetch unit. If the data read from the data memory includes an error, the execution unit of the processor according to an embodiment may correct the corresponding error and store the information about the corrected data in the ECC cache memory within the execution unit.

In some implementations, the instruction fetch unit or the execution unit may re-reference the previously referenced instructions or data. For example, the instruction fetch unit may read the same instruction as the previously read instruction among the instructions stored in the instruction memory according to the host's request, or the execution unit may read the data that is the same as the previously read data among the data stored in the data memory according to the host's request.

In some implementations, when the instruction fetch unit or the execution unit reads the previously read instruction word or data, that is, when re-referencing the previously referenced instruction word or data, the ECC cache memory decide whether the ECC cache memory includes the corresponding instruction word or data (S1010). For example, since the ECC cache memory within the instruction fetch unit or the execution unit stores together a memory address information where the corresponding instruction or data is stored, the instruction fetch unit or the execution unit may determine whether the ECC cache memory includes the corresponding instruction or data based on the memory address information where the corresponding instruction or data is stored.

In some implementations, if the instruction fetch unit or the execution unit determines that the ECC cache memory includes the information about the corresponding instruction or data, the instruction fetch unit or the execution unit may read the corresponding instruction or data stored in the ECC cache memory (S1020). In this way, the instruction fetch unit or the execution unit reads the instruction or data stored in the ECC cache memory, compared to reading the instruction or data stored in the instruction memory that is disposed outside the processor, it may reduce a waiting time and reduce an unnecessary data bus occupancy.

In some implementations, if the instruction fetch unit or the execution unit determines that the ECC cache memory does not include the information about the corresponding instruction or data, the instruction fetch unit or the execution unit may read the corresponding instruction or data stored in the instruction memory or the data memory (S1030).

Figure 11:
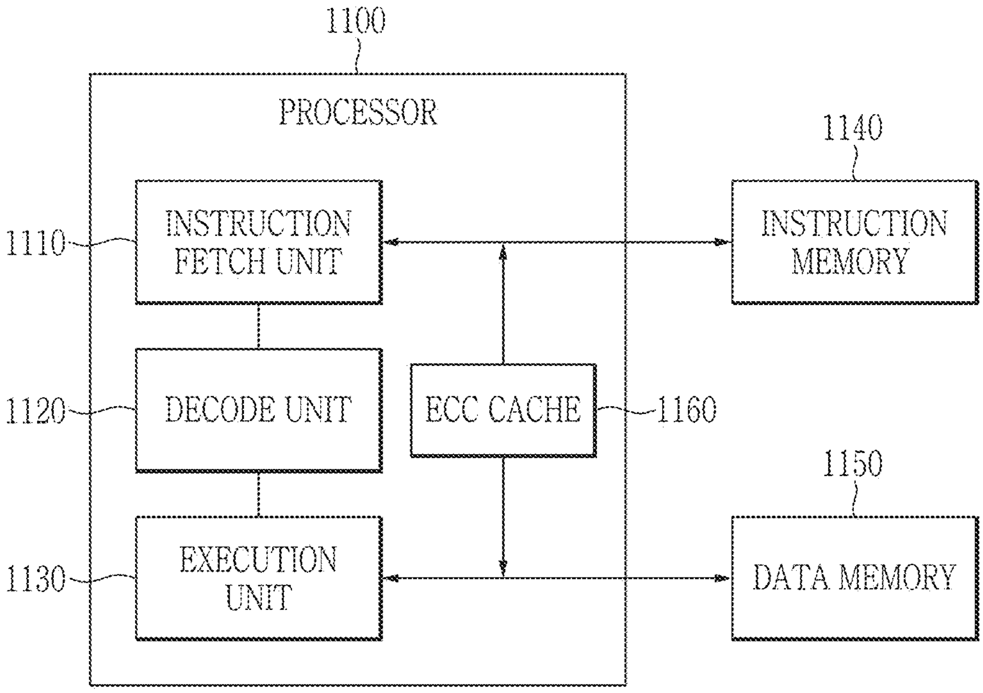
FIG. 11 is a view showing examples of a configuration and an operation of a processor according to some implementations.

FIG. 11 is a view showing examples of a configuration and operation of a processor according to some implementations. In FIG. 11, a processor 1100 may include an instruction fetch unit 1110, a decode unit 1120, and an execution unit 1130. The instruction fetch unit 1110 may read instructions from the instruction memory 1140, and the execution unit 1130 may read data stored in the data memory 1150.

In some implementations, the instruction fetch unit 1110 and the execution unit 1130 may share one ECC cache memory 1160. Specifically, the instruction fetch unit 1110 may detect an error included in the instruction read from the instruction memory 1140, correct the error, and generate the corrected data. The instruction fetch unit 1110 may store an information about the corrected data in the ECC cache memory 1160. The instruction fetch unit 1110 may store the position of the error bit or the corrected data as an information about the corrected data, along with the memory address of the instruction memory 1140 where the corresponding instruction was stored, in the ECC cache memory 1160. Additionally, the execution unit 1130 may detect errors included in data read from the data memory 1150 and correct them to generate the corrected data. The execution unit 1130 may store the information about the corrected data in the ECC cache memory 1160. The execution unit 1130 may store the position of the error bit or the corrected data in the ECC cache memory 1160 as an information about the corrected data, along with the memory address of the data memory 1150 where the corresponding data was stored.

In some implementations, the corrected data stored in the ECC cache memory 1160 may be transmitted to the instruction memory 1140 or the data memory 1150 during the stall cycle of the pipeline, or may be transmitted to the instruction memory 1140 or the data memory 1150 by a cache flush instruction of the processor.

Figure 12:
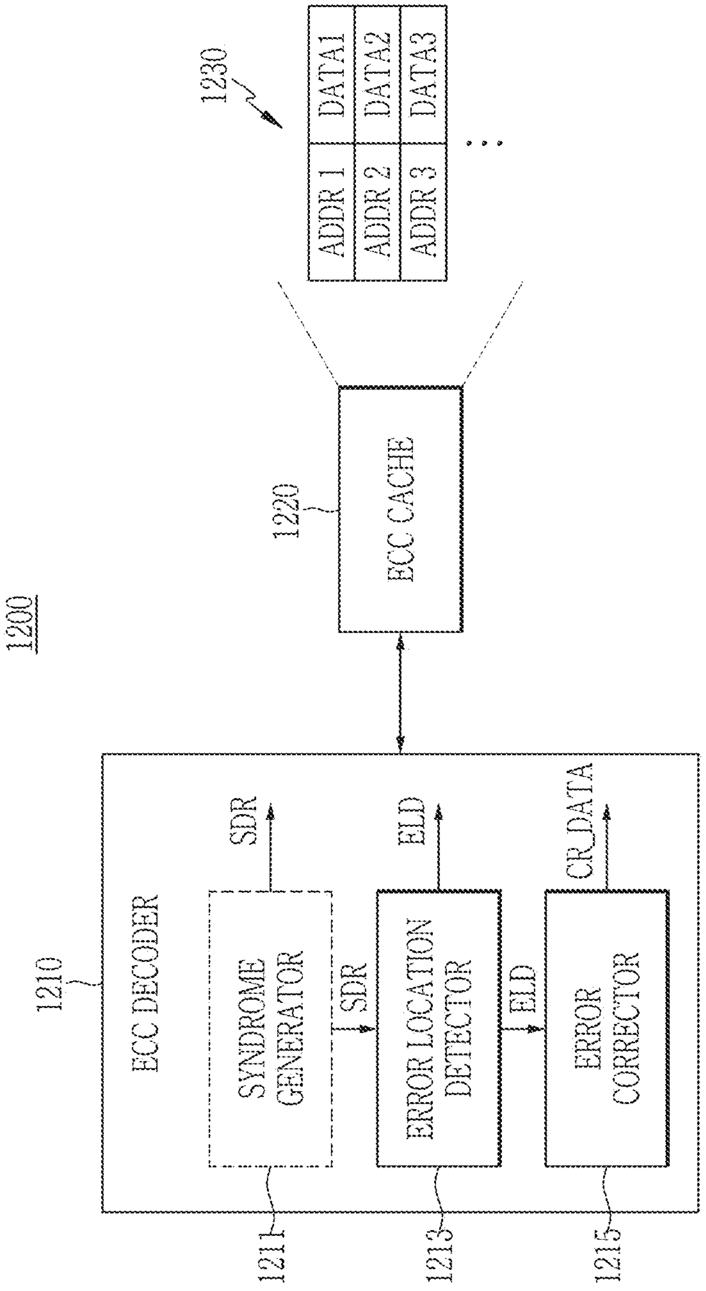
FIG. 12 is a view showing an example of information stored in an ECC cache memory according to some implementations.

FIG. 12 is a view showing an example of an information stored in an ECC cache memory according to an some implementations. Specifically, the ECC unit 1200 according to an embodiment may include an ECC decoder 1210 and an ECC cache memory 1220. The ECC cache memory 1220 according to an embodiment may receive and store an information 1230 about the corrected data from the ECC decoder 1210. Below, for a more concise explanation, the operation of the instruction fetch unit will be representatively described. However, the range of the present disclosure is not limited thereto, and the execution unit may also perform the same or similar operations.

In some implementations, the ECC decoder 1210 may include a syndrome generator 1211, an error location detector 1213, and an error corrector 1215. In some implementations, the ECC unit 1200 may correct errors in a data by using various error correction codes. For example, the ECC unit 1200 according to an embodiment may use the error correction code such as Bose-Chaudhuri-Hocquenghem (BCH) code or Reed-Solomon code.

In some implementations, the syndrome generator 1211 may receive a read data from an instruction memory. The syndrome generator 1211 may receive a code word CW including an instruction and a parity bit as a read data. In some implementations, the read data may include errors. The syndrome generator 1211 may generate a syndrome SDR for the read data in order to detect the presence or absence of errors in the read data. In an embodiment, if the syndrome generator 1211 generates the syndrome SDR with a value of 0, it may be determined that the read data does not include an error. In some implementations, if the syndrome generator 1211 generates the syndrome SDR having a random value other than 0, it may be determined that the read data includes an error. The syndrome generator 1211 may transmit the syndrome SDR to the error location detector 1213.

In some implementations, the error location detector 1213 may generate an error locator polynomial based on the syndrome SDR and obtain the error position information ELD indicating the position of the error bit by using a Chien Search.

In some implementations, the error corrector 1215 may obtain the corrected data CR_DATA based on the error position information ELD. For example, the error corrector 1215 may obtain an error value based on the error position information ELD and generate the corrected data CR_DATA by adding the error value and the read data.

In some implementations, the ECC decoder 1210 may transmit an information 1230 about the corrected data to the ECC cache memory 1220. In some implementations, the information about the corrected data may include the syndrome SDR, the error position information ELD, or the corrected data CR_DATA. The ECC cache memory 1220 may store the syndrome SDR, the error position information ELD, or the corrected data CR_DATA received from the ECC decoder 1210 as an information DATA1, DATA2, DATA3, . . . about the corrected data. In some implementations, the ECC decoder 1210 may transmit the address of the instruction memory where the corresponding code word was stored to the ECC cache memory 1220 as the address of the instruction memory where the corrected data will be stored. The ECC cache memory 1220 may store the address of the instruction memory received from the ECC decoder 1210 as the address ADDR1, ADDR2, ADDR3, . . . of the instruction memory where the corrected data will be stored.

In some implementations, the ECC unit 1200 may transmit the corrected data CR_DATA to the instruction memory based on the address ADDR1, ADDR2, ADDR3, . . . of the instruction memory stored in the ECC cache memory 1220 and the information DATA1, DATA2, DATA3, . . . of the corrected data. Specifically, the ECC decoder 1210 may receive the address and the syndrome SDR of the instruction memory, or the address and the error position information ELD of the instruction memory from the ECC cache memory 1220. The ECC decoder 1210 may generate the corrected data CR_DATA based on the syndrome SDR or the error position information ELD received from the ECC cache memory 1220, and write the corrected data CR_DATA to the corresponding address based on the address of the instruction memory. In some implementations, the ECC decoder 1210 may receive the address of the instruction memory and the corrected data CR_DATA from the ECC cache memory 1220. The ECC decoder 1210 may write the corrected data CR_DARA to the corresponding address based on the address of the instruction memory received from the ECC cache memory 1220.

Figure 13:
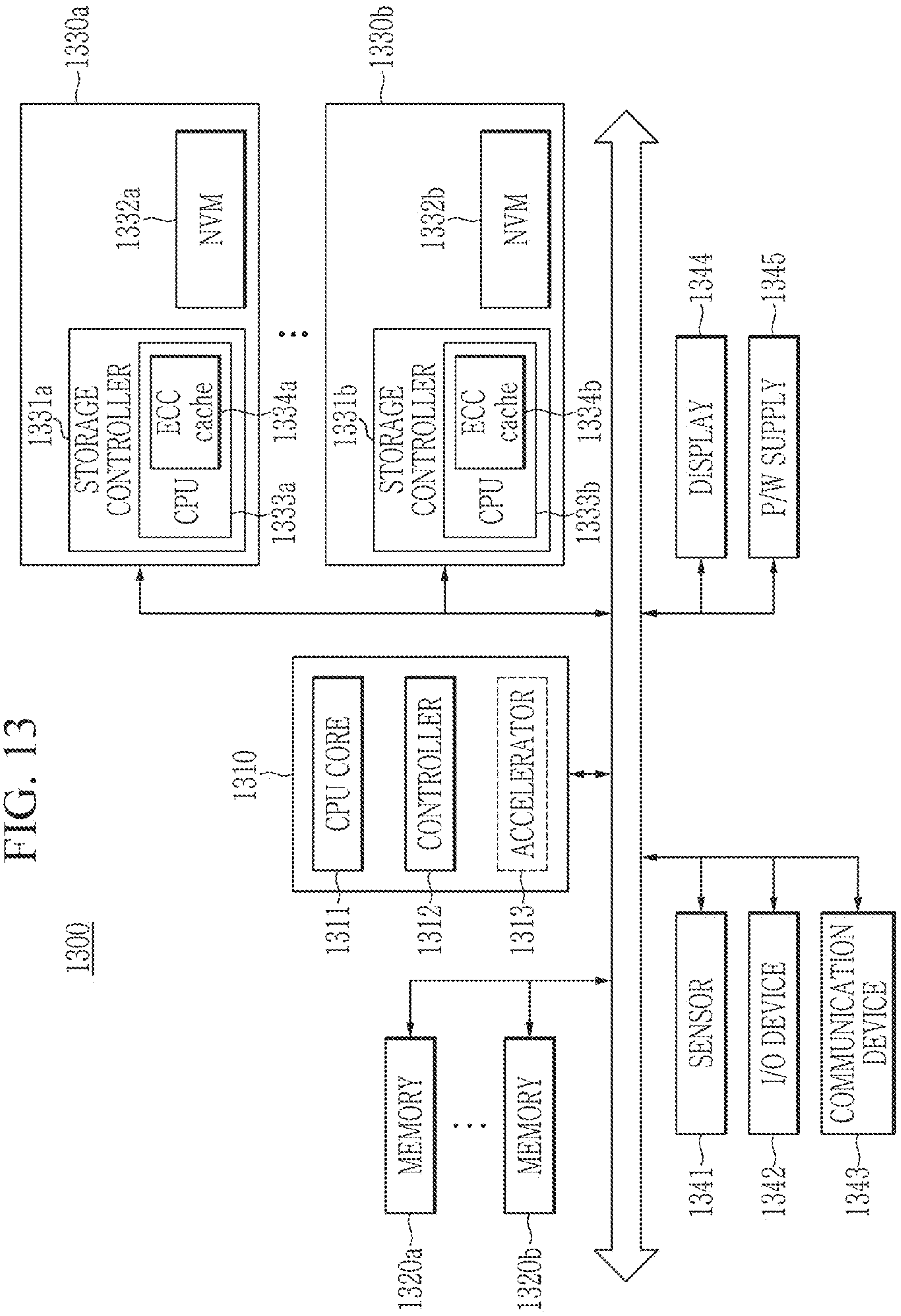
FIG. 13 is a view showing an example of an electron system according to some implementations.

FIG. 13 is a view showing an example of an electron system according to some implementations. In FIG. 13, a system 1300 may include a main processor 1310, a memory 1320*a* and 1320*b*, and a storage devices 1330*a* and 1330*b*, and may further include a sensor (SENSOR) 1341, an input/output device (I/O DEVICE) 1342, a communication apparatus (COMMUNICATION DEVICE) 1343, a display (DISPLAY) 1344, and a power supply (P/W SUPPLY) 1345.

The main processor 1310 may control the overall operation of the system 1000, and more specifically, the operation of other components that make up the system 1300. The main processor 1310 may be implemented as a general-purpose processor, a dedicated processor, or an application processor.

The main processor 1310 may include one or more CPU cores 1311 and may further include a controller 1312 to control the memory 1320*a* and 1320*b* and/or the storage device 1330*a* and 1330*b*. According to some implementations, the main processor 1310 may further include an accelerator 1313, which is a dedicated circuit for high-speed data operations such as artificial intelligence (AI) data operations. Such accelerator 1313 may include a graphics processing unit (GPU), a neural processing unit (NPU) and/or a data processing unit (DPU), and may also be implemented as a separate chip that is physically independent from other components of the main processor 1310.

The memory 1320*a* and 1320*b* may be used as the main memory device of the system 1300 and may include a volatile memory such as SRAM and/or DRAM, but may also include a non-volatile memory such as flash memory, PRAM and/or RRAM. The memory 1320*a* and 1320*b* may also be implemented in the same package as the main processor 1310.

The storage device 1330*a* and 1330*b* may include a storage controller 1331*a* and 1331*b* and a non-volatile memory (NVM, 1332*a* and 1332*b*). The storage controller 1331*a* and 1331*b* may include a CPU 1333*a* and, 1333*b* that control the overall operation of the storage device 1330*a* and 1330*b*. The CPU 1333*a* and 1333*b* may include an ECC cache memory 1334*a* and 1334*b* that store the corrected data or the information about the corrected data. In some implementations, the CPU 1333*a* and 1333*b* may be the processor described with reference to FIG. 1, and FIG. 6 to FIG. 12, and the ECC cache memory 1334*a* and 1334*b* may be the ECC cache memory described with reference to FIG. 1, and FIG. 6 to FIG. 12. The CPU 1333*a* and 1333*b* and the ECC cache memory 1334*a* and 1334*b* may be operated based on the operation method described with reference to FIG. 1, and FIG. 6 to FIG. 12.

The storage device 1330*a* and 1330*b* may be included in the system 1300 while being physically separated from the main processor 1310, or may be implemented in the same package as the main processor 1310. Additionally, the storage device 1330*a* and 1330*b* may have a form such as a solid state device (SSD) or a memory card. Such storage device 1330*a* and 1330*b* may be devices to which standard protocols such as a universal flash storage (UFS), an embedded multi-media card (eMMC), or a non-volatile memory express (NVMe) are applied, but are not necessarily limited to these.

The sensor 1341 may detect various types of physical quantities that may be obtained from the outside the system 1300 and convert the detected physical quantities into electric signals. Such sensor 1341 may be a temperature sensor, a pressure sensor, an illuminance sensor, a position sensor, an acceleration sensor, a bio sensor and/or a gyroscope sensor, etc.

The user input device 1342 is capable of receiving various types of data input from the user of system 1300, and includes a touch pad, a keypad, a keyboard, a mouse and/or a microphone), etc.

The communication apparatus 1343 may transmit and receive signals between other devices outside the system 1300 according to various communication protocols. Such communication apparatus 1540 may be implemented including an antenna, a transceiver, and/or a modem (MODEM), etc.

The display 1344 may function as an output device that outputs a visual information to the user of the system 1300.

The electric power supply device 1345 may properly convert an electric power supplied from a battery (not shown) built into the system 1300 and/or an external power source to be supplied to each component of the system 1300.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A processor comprising:

an instruction fetch circuit configured to read a first instruction stored in a memory through a first data bus according to a first instruction fetch in a first cycle, generate a first correction instruction configured to correct an error based on an error checking and correcting (ECC) operation, store information for the first correction instruction in the first cycle, read a second instruction stored in the memory through the first data bus according to a second instruction fetch in a second cycle after the first cycle while the information for the first correction instruction is stored, and transmit, in a third cycle after the second cycle, the first correction instruction to the memory through the first data bus based on a flush condition for transmitting the first correction instruction to the memory being satisfied, the flush condition representative of the first data bus being free of data transmission after the first cycle and the second cycle;

a decode circuit configured to receive the first correction instruction and decode the first correction instruction; and an execution circuit configured to receive the decoded first correction instruction and execute an operation according to the first correction instruction.

2. The processor of claim 1, wherein the instruction fetch circuit comprises:

an ECC circuit configured to perform the ECC operation on the first instruction and generate the first correction instruction; and an ECC cache memory configured to receive the information about the first correction instruction from the ECC circuit and store the information about the first correction instruction.

3. The processor of claim 2, wherein the ECC circuit comprises:

an error location detector configured to detect a position of a bit where an error occurred in the first instruction and generate the position of the bit where the error occurred as error position information; and an error corrector configured to generate the first correction instruction based on the error position information.

4. The processor of claim 3, wherein the information about the first correction instruction includes at least one of the error position information and the first correction instruction.

5. The processor of claim 2, wherein, based on the flush condition being satisfied, the ECC circuit is configured to read the information about the first correction instruction stored in the ECC cache memory and to obtain the first correction instruction based on the information about the first correction instruction.

6. The processor of claim 2, wherein the flush condition comprises the processor instructing a cache flush to the ECC cache memory.

7. The processor of claim 2, wherein the instruction fetch circuit is configured to read the information about the first correction instruction stored in the ECC cache memory as the first instruction according to a third instruction fetch in a fourth cycle.

8. The processor of claim 3, wherein the ECC circuit further comprises a syndrome generator configured to generate a syndrome for the first instruction and transmit the syndrome to the error location detector so that the error location detector generates the error position information.

9. The processor of claim 8, wherein the information about the first correction instruction comprises at least one of the syndrome, the error position information, or the first correction instruction.

10. The processor of claim 1, wherein the flush condition comprises a stall of a pipeline of the processor.

11. The processor of claim 10, wherein, in a stall cycle when the pipeline is stalled, the first data bus is not occupied by any data.

12. The processor of claim 1, wherein the execution circuit is configured to:

read first data stored in the memory through a second data bus according to the first instruction;

perform the ECC operation on the first data to generate first correction data that an error is corrected; and store the information about the first correction data until the flush condition is satisfied.

13. The processor of claim 12, wherein the execution circuit comprises:

an ECC circuit configured to perform the ECC operation on the first data and generate the information on the first correction data based on the ECC operation, and an ECC cache memory configured to receive information about the first correction data from the ECC circuit and store the information about the first correction data.

14. An operation method of a processor comprising:

reading a first instruction from an instruction cache through a first data bus;

correcting an error of the first instruction and generating a first correction instruction;

storing information about the first correction instruction;

reading a second instruction from the instruction cache through the first data bus, while the information about the first correction instruction is stored; and writing back the first correction instruction to the instruction cache through the first data bus based on a flush condition being satisfied, the flush condition representative of the first data bus being free of data transmission.

15. The operation method of the processor of claim 14, wherein correcting the error of the first instruction and generating the first correction instruction comprises:

detecting an error within the first instruction and generating an error position information indicating a position of a bit where the error occurred in the first instruction; and generating the first correction instruction in which the error is corrected based on the error position information.

16. The operation method of the processor of claim 15, wherein storing information about the first correction instruction comprises:

receiving at least one of the error position information and the first correction instruction;

receiving an address where the first instruction was stored in the instruction cache; and storing at least one of the error position information and the first correction instruction and the address.

17. The operation method of the processor of claim 14, wherein the flush condition includes a pipeline of the processor being stalled, the processor instructing a cache flush, or both the pipeline of the processor being stalled and the processor instructing a cache flush.

18. The operation method of the processor of claim 17, wherein, in a stall cycle when the pipeline is stalled, the first data bus is not occupied by data.

19. The operation method of the processor of claim 14, wherein writing back the first correction instruction to the instruction cache through the first data bus comprises:

obtaining the first correction instruction based on the information about the first correction instruction; and changing the first instruction in the instruction cache to the first correction instruction.

20. A memory system comprising:

a cache memory configured to store a plurality of data, and a processor configured to read first data and second data among the plurality of data from the cache memory, through a data bus, according to a host request, store first error corrected data and second error corrected data generated according to an error checking and correcting (ECC) operation for the first data and the second data, and transmit the first error corrected data and the second error corrected data to the cache memory based on a cache flush instruction, wherein the transmission of the first error corrected data and the second error corrected data is performed when the data bus is free of data transmission.

* * * * *